Oct. 26, 1965     M. D. PERSIDSKY     3,214,233
PHOTOGRAPHIC APPARATUS Filed April 3, 1961     8 Sheets-Sheet 1

FIG. 1

*INVENTOR.*
MAXIM D. PERSIDSKY
BY
ATTORNEY

Oct. 26, 1965     M. D. PERSIDSKY     3,214,233
PHOTOGRAPHIC APPARATUS Filed April 3, 1961     8 Sheets-Sheet 3

INVENTOR.
MAXIM D. PERSIDSKY
BY
ATTORNEY

Oct. 26, 1965         M. D. PERSIDSKY            3,214,233
                     PHOTOGRAPHIC APPARATUS
Filed April 3, 1961                          8 Sheets-Sheet 4

FIG. 6

INVENTOR.
MAXIM D. PERSIDSKY
BY
ATTORNEY

FIG. 7

INVENTOR.
MAXIM D PERSIDSKY

Oct. 26, 1965　　　M. D. PERSIDSKY　　　3,214,233
PHOTOGRAPHIC APPARATUS
Filed April 3, 1961　　　　　　　　　　　　　8 Sheets-Sheet 6

INVENTOR.
MAXIM D. PERSIDSKY
BY
ATTORNEY

Oct. 26, 1965 M. D. PERSIDSKY 3,214,233
PHOTOGRAPHIC APPARATUS
Filed April 3, 1961 8 Sheets-Sheet 7

INVENTOR.
MAXIM D. PERSIDSKY
BY
ATTORNEY

United States Patent Office 3,214,233
Patented Oct. 26, 1965

3,214,233
PHOTOGRAPHIC APPARATUS
Maxim D. Persidsky, 115 15th Ave., San Francisco, Calif.
Filed Apr. 3, 1961, Ser. No. 100,040
4 Claims. (Cl. 352—184)

This invention relates to motion picture cameras and projectors, and more particularly relates to a method and apparatus for intermittently transporting film in cameras and projectors by repeatedly propagating along stationary film strip hump-like convolutions which displace the film past a photographic aperture of the apparatus in operable manner to provide successive frames temporarily stationary at the aperture. The desired movement of the film is effected by placing the film in contacting adjacency with a guide member in a manner which restrains the film from being moved in the plane of the guide member but enables it to be moved transverse to the plane of the guide member thereby making it possible for wavelike anomalies of film to protrude from the plane of the guide member at regular intervals and be propelled along the film strip past a photographic aperture. Displacement of the film strip at the photographic aperture occurs upon the passage of each wave of film thereby advancing the film in a manner which is requisite for use in motion picture cameras and projectors. In one embodiment of this invention conveyor actuated rollers press the film against the guide member and propel the wave-like anomalies in the film along the guide member. In another embodiment of the invention differential air pressure imposed across the film and guide member support the film and propel anomalous convolutions therealong.

The apparatus of this invention reduces the magnitude of physical stresses imposed upon motion picture film strip during use in comparison to conventional film feeding mechanisms wherein film is intermittently transported past a photographic aperture by intermittent tensile or compressive forces being suddenly applied to the film strip by an indexing claw member which engages perforations in the film. To withstand these forces film has been required to be made stronger than is necessary for utility solely as a photographic emulsion substrate. The method of transporting film which is disclosed herein enables continuous, non-intermittent forces to move film strip past a photographic aperture by imposing stresses of relatively small magnitude upon the film strip, with the result obtaining that film strip of less strength and thickness may be used in the disclosed apparatus than can be used in conventional apparatus.

Another advantage provided by the present invention is that high speed change of film images may be accomplished accompanied by relatively low levels of vibration in the photographic apparatus. The elimination of reciprocating parts and the utilization of rotating components in the disclosed photographic apparatus enables film registry to be accomplished with comparatively less wear and tear on the film and apparatus than is possible in conventional apparatus, particularly during high speed cinematography.

A further advantage is secured in the disclosed method and apparatus by providing means for changing film images rapidly and enabling correspondingly longer exposure or projection times to be secured for each individual image than is available in conventional apparatus. An increase in exposure time enables picture photography and projection to be accomplished with light sources of lesser illumination than are necessary with conventional photographic apparatus having slower image changing means.

A still further advantage is secured in the disclosed invention in which high speed image change method and apparatus are provided. Reduction of flickering of projected images upon the viewing screen during motion picture projection is achieved by rapid film-advancing means. The shutter of a motion picture projector intercepts light rays from the projection lamp during the time that film images are being changed to prevent distorted images from being projected upon the viewing screen. When film image changes are accomplished rapidly as they are in the disclosed apparatus, interruption of light from the projection lamp is of such short time duration flickering of the light noticeable to a person viewing the screen is minimized.

A primary object of this invention is to provide a motion picture film transporting method whereby motion picture film located adjacent to a photographic aperture is intermittently and operably advanced past the photographic aperture by bights of film of wave-like shape being propagated along the film strip.

Another object of the invention is to provide photographic apparatus in which film strip is intermittently advanced past a photographic aperture by bights of wave-like form being formed in the film strip and being propelled along the stationary film strip past the photographic aperture.

Another object of this invention is to provide photographic apparatus on which bights of film of wave-like shape are formed and transported by the interaction and continuous advance of two endless conveyors equipped with appending fingers and rollers, said conveyors transporting the film bights to accomplish displacement of the film strip adjacent to a photographic aperture.

Another object of this invention is to provide photographic apparatus in which bights of film of wave-like form are propagated past a photographic aperture by the moving force of an air pressure differential existing across the form of the bights, the movement of said bights causing a displacement of the film strip adjacent to the photographic aperture.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
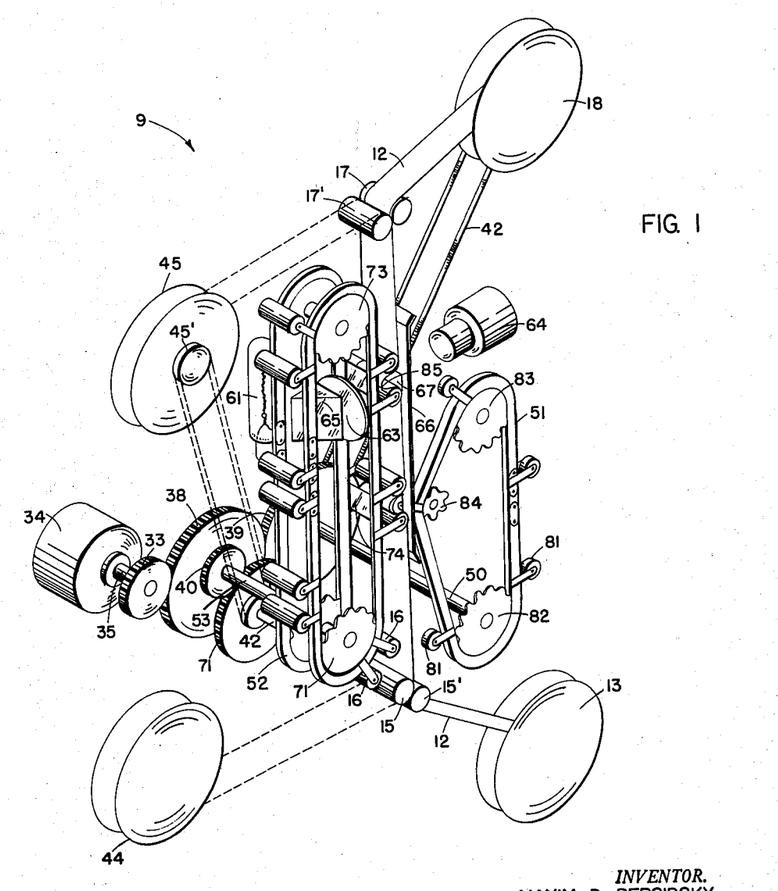
FIGURE 1 is a perspective view in cutaway of an embodiment of motion picture apparatus of this invention adapted for use as a projector.
Figures 2, 3:
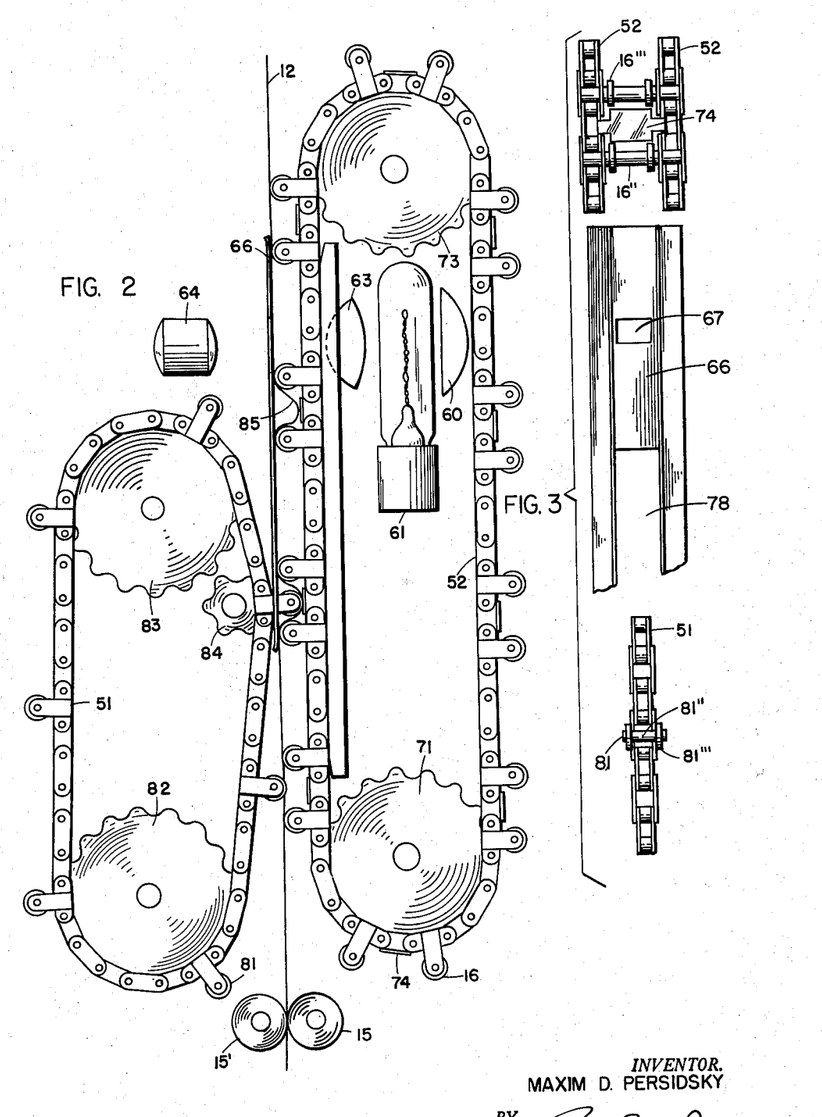
FIGURE 2 is a side elevation of a portion of the projector of FIGURE 1 with the projection light in changed position.
FIGURE 3 is a front elevation of a portion of the projector embodiment of FIGURE 2.

Referring now to FIGURES 1, 2 and 3, projector 9 comprises projection lamp 61, condenser lens 63, and focusing lens 64 arranged in well known manner. In FIGURE 1 projection lamp 61 is offset from the optical axis of condenser lens 63 and focusing lens 64 to provide better cooling for lamp 61 and, for lenses 63 and 64. Right angle prism 65 is operably placed to the rear of condenser lens 63 and directs uncollimated light from lamp 61 into condenser lens 63. In FIGURE 2 projection lamp 61, and lamp reflector 60 are positioned in direct alignment with lenses 63 and 64 in a more conventional arrangement with prism 65 being thereby eliminated. Either arrangement may be utilized as desired. Film strip 12 after being drawn from feed reel 13 is threaded in sequence between guide rollers 15 and 15', between film transport rollers 16 and loop or bight forming roller 81, along the rear side of film guide plate 66 and over idle roller 17 onto takeup reel 18.

The film transport mechanism for advancing film 12 through the focal plane of lens 64 comprises endless conveyor 52 mounted on sprockets 71 and 73. A plurality of roller pair sets comprising rollers 16 are mounted on conveyor 52, and a plurality of shutter plates 74 are affixed thereto between the closely spaced adjacent rollers 16 of each roller pair as shown. Chain 51 is shown mounted on drive sprocket 82 and idler sprockets 83 and 84, and has mounted thereon a plurality of evenly spaced rollers 81. Film guide plate 66 is disposed in near adjacency to conveyor 52 and is configured with a center slot 78 along its lower length for enabling rollers 81 to extend beyond the plane of plate 66. Film gate 67 is disposed in the optical path of lenses 63 and 64 as shown.

Motor 34 of projector 9 is preferably an electric motor which can run on either A.C. or D.C. low voltage output such as from flashlight drycell batteries or from stepped-down power line alternating current. The provision of an A.C.-D.C. motor enables projector 9 to be operated from a portable power pack comprised on drycell batteries when it is convenient, such as when the apparatus is converted for use as a camera, or to be used with line voltage such as 115 volt A.C. in conjunction with an appropriate auxiliary step-down transformer. Alternatively motor 34 may be any other type of motor such as an electric or spring wound motor as are conventionally used on motion picture equipment. Drive gear 33 on motor shaft 35 is meshed with speed reduction gear 38. Drive sprocket 71 is connected to gear 38 by means of shaft 53. Gear 38 is meshed with identical gear 39 to which drive sprocket 82 is fixed by means of shaft 50. Drive sprockets 71 and 82 are preferably identical in size and drive conveyor 52 and chain 51 at identical speeds. Pinion gear 40 is fixedly mounted on shaft 53 and is meshed with gear 71 on shaft 42'. Shaft 42' enables film guide roller 15 to be operably rotated by motor 34. Film guide roller 15' is rotated by frictional contact with roller 15. The two rollers advance film strip 12 at a rate equal to the rate with which loops or bights in the film are caused to increase in length so that constant speed on unwinding of film strip 12 from feed reel 13 as shown is obtained with attendant minimization of physical stress in the film.

A pulley (not shown) affixed to the end extremity of shaft 50 adjacent gear 39 drives belt 42 which is used to turn film take-up reel 18. Belt 42 is preferably an endless resilient coil spring means as is conventionally used to provide continuous low torque turning effort on a take-up reel such as reel 18.

In operation film strip 12 is moved upward between film guide rollers 15 and 15'. Roller 81 is brought into position between rollers 16 by movement in a direction transverse to the plane of the film as shown. Film strip 12 is looped between rollers 16 by roller 81 until the position of roller 81 as shown is reached opposite idler sprocket 84 at which position roller 81 has reached the limit of its travel transverse to the plane of film strip 12. At the moment one roller 81 reaches this position the next adjacent roller 81 preferably contacts film strip 12 and is moved in a transverse direction to the plane of the strip so that there exists continuous and uniform unwinding of film strip 12 from feed reel 13 during operation of projector 9.

Sprockets 71 and 82 as shown drive conveyor 52 and chain 51 respectively. Although rollers 16 and 81 carried by conveyor 52 and chain 51, respectively, cause protruded wave-like loops 85 in the film strip 12 to be formed by the motion of roller 81 moving in a direction transverse to film strip 12 between rollers 16, the shape of loops 85 is maintained by the film strip being firmly held between film guide plate 66 and rollers 16. Conveyor 52 carries rollers 16 along film guide plate 66 firmly in contact with film strip 12 which is pressed against the guide plate. Rollers 16 rotate as they travel upward along guide plate 66 by the frictional forces between them and film strip 12. Film strip 12 is correspondingly held stationary against guide plate 66 by the pressure of rollers 16 thereon and by the frictional force between the film and the guide plate. Film loops 85 are moved upward along film as rollers 16 move upward, and since the film is prevented from sliding between rollers 16 and guide plate 66, the segments of film which form loops 85 are continuously changing as loops 85 are moved along guide plate 66.

Film strip 12 is repositioned upward on film guide plate 66 by the passage of each bight or loop 85 by a distance equal to the difference between the length of film strip 12 forming loop or bight 85 and the length of the base of the bight. This differential length is made equal to the height of one frame on film strip 12 so that as film loop 85 passes photographic aperture 67 film 12 is displaced at aperture 67 one frame, thus registering the film advance necessary for operation of projector 9. Shutter plates 74 are affixed to chain 52 between members of each pair of rollers 16 so that light from lamp 61 and condenser lens 63 is intercepted by shutter plate 74 and is prevented from projecting through the film while a film loop 85 passes photographic aperture 67. Film strip 12 is intermittently and operably advanced by successive passages of film loops 85 as each roller of the plurality of rollers 16 pass upward past photographic aperture 67.

As shown in FIGURE 3 rollers 16 and 81 are preferably configured with a center portion 16" and 81" of lesser diameter than the end portions 16''' and 81''' thereof so that only the edgemost extremities of the faces of the film strip are contacted by the rollers. The film strip may either be non-perforated as shown in FIGURE 1 or may be perforated in conventional manner. The portion of the film strip which contains an exposed image is not contacted by components of the film strip transport mechanism and scratching of the film strip is avoided. It is to be understood that other embodiments of film transport rollers may be utilized such as cylindrically configured rollers 16' and 81' of FIGURE 5.

In FIGURE 1 a changed position of film strip 12 is shown in broken line representation. Camera feed reel 44 and take-up reel 45 are housed in projector 9, and film strip 12 may be threaded from these reels over roller 17' as shown in broken line drawing to convert the apparatus from a projector into a camera. Projection lamp 61, prism 65 and condenser lens 63 may be removed from the apparatus when it is used as a camera, if it is desired, however, these components may remain in the camera. Reels 13 and 18 are removed from the camera and belt 42 is connected to pulley 45' to drive reel 45 as shown. Motor 34 is advantageously battery powered in the camera, however, battery means are not shown for the sake of convenience.

Figure 4:
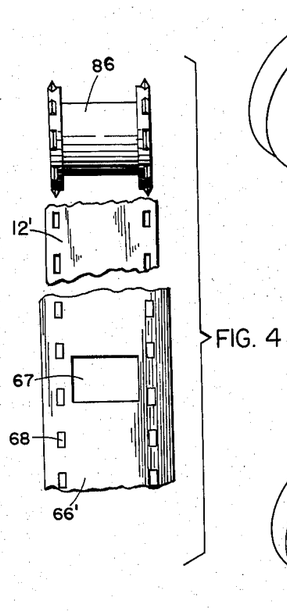
FIGURE 4 is a front elevation of another embodiment of the device of FIGURE 3.

In FIGURE 4 is shown another embodiment of film transport means of this invention. When perforated film 16' shown is used film transport rollers may be replaced by sprockets 86 which run in perforations 68 in guide plate 66' and insure positive registry of the film strip at film gate 67. Sprockets 86 and rollers 16 may be made of nylon, rubber, steel or the like.

Figure 5:
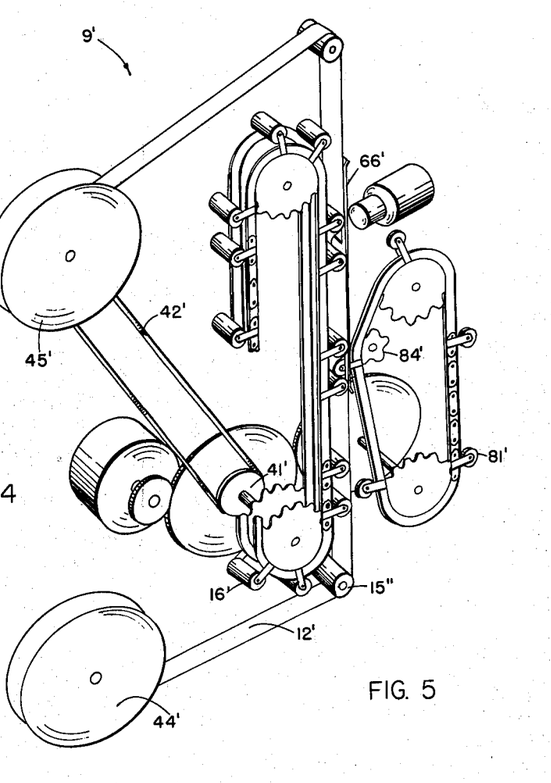
FIGURE 5 is a perspective view of another embodiment of motion picture apparatus of this invention adapted for use as a camera.

In FIGURE 5 is shown camera 9' similar to projector 9 of FIGURE 1, but of simplified construction. Film guide roller 15" is an idler pulley over which film strip 12' is passed. The film strip is drawn from feed reel 44' at a substantially continuous rate by a cylindrical roller 81' contacting film strip 12' substantially simultaneously with the passage of the next adjacent preceding cylindrical roller 81' past sprocket 84'. Continuous and uniform transverse movement of film strip 12' relative to guide plate 66' is thus obtained. Members 16' and 66' correspond to members 16 and 6 described in connection with other figures and function in similar manners. Since rollers 81' are cylindrical they are caused to contact the portion of the film receiving a photographic image. While this is not a preferred configuration in comparison to rollers 16 and 81 of FIGURE 3, it is not objectionable because the film is passed through the camera only once, while in a projector similar means would be less desirable because repeated showings of the film would cause repeated contact to be made between film and rollers with greater abrasion of the film occurring than would occur with rollers 81 of FIGURE 1. Belt 42' is connected to reel 45' and to pulley 41' to provide the necessary power to the camera take-up reel.

Figure 6:
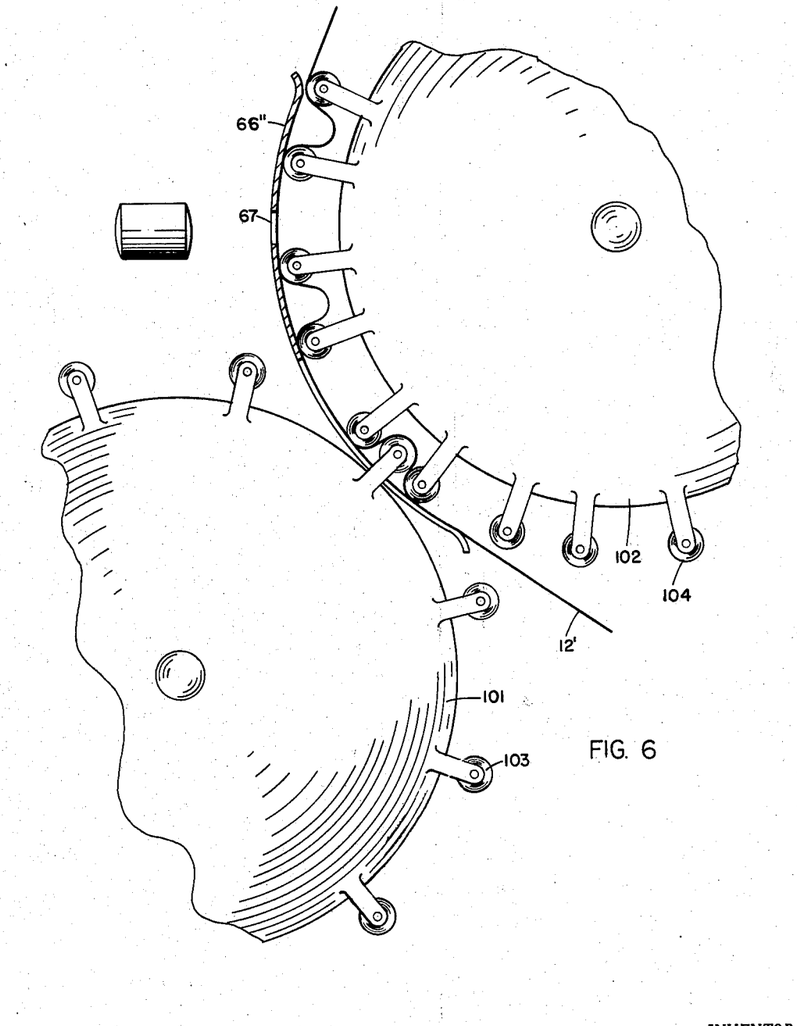
FIGURE 6 is another embodiment of the apparatus of this invention for transporting film strip in motion picture apparatus.

In FIGURE 6 another embodiment of a film transport mechanism of this invention is shown. A pair of rotating wheel members 101 and 102 are provided with film guide plate 66" disposed therebetween. Wheel members 101 and 102 may be of identical size as shown or may be of different sizes if desired. The wheel members may be driven in any operable manner at uniform peripheral velocities. Rollers 103 on wheel member 101 and rollers 104 on wheel member 102 contact film strip 12' and operably advance it in a manner similar to that effected by rollers 81 on chain 51 and rollers 16 and 16'.

Figure 7:
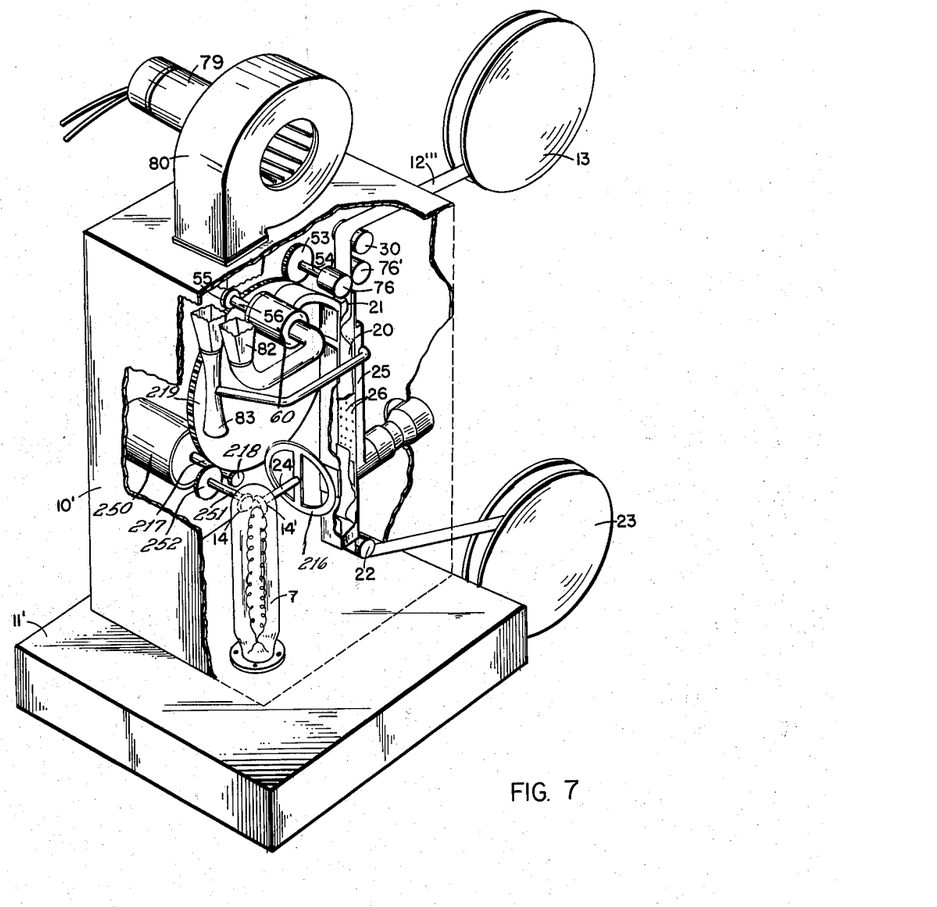
FIGURE 7 is a perspective view in cutaway of pneumatically operated motion picture apparatus.
Figure 8:
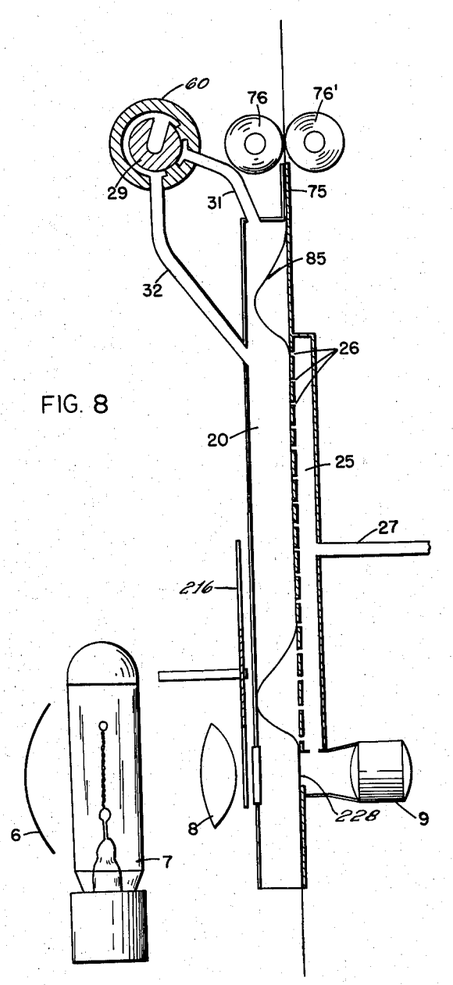
FIGURE 8 is a cross-sectional side elevation of a portion of the device of FIGURE 7.

In FIGURES 7 and 8 another embodiment of the invention is illustrated wherein pneumatic film transporting means are shown installed in a camera. Casing 10' comprises an enclosure which is mounted on base member 11'. Film strip 12" is drawn from feed reel 13 and is threaded over idler roller 30 and between film feed rollers 76 and 76' and through film slot 21 into close proximity to the forward wall of air chamber 20, then under idler roller 22 and onto take up reel 23. Rotary shutter 216 is continuously driven by motor 250 by a power train comprising motor shaft 217, drive gear 218, reduction gear 219, pinion gear 252, shaft 251, bevel gears 14, 14', and shaft 24 to which shutter 216 is affixed. Reduction gear 219 drives gear 53 affixed to roller 76 by shaft 54, and also drives pinion gear 55 to which rotary air valve 60 is linked by means of shaft 56. Rotary valve member 29 in rotary valve 60 is affixed to the end of shaft 56.

Revolving shutter 216 is shown positioned between projection lamp 7 and film 12''' to intercept light from projection lamp 7 when film strip 12''' is operably advanced past the optical aperture 228 of the projector. Other conventional and necessary components such as lamp reflector 6, condensing lens 8, and focusing lens 9 are provided in conventional manner as shown in FIGURE 8.

Exhaust ports 26 connect the interior of chamber 20 to that of vacuum manifold 25. Vacuum manifold 25 is partially evacuated by means of vacuum duct 27 which operably communicates with the throat of Venturi tube 83, on centrifugal blower 80. Centrifugal blower 80 is powered by motor 79, and a portion of the blower air output is ducted to rotating member 29 of rotary valve 60 by duct 82 disposed adjacent tube 83. Duct 31 and duct 32 provides means for conveying pressurized air from rotary valve 29 to air chamber 20.

In operation film strip 12''' is introduced into air chamber 20 through film feed slot 75 continuously and at a constant rate by film feed rollers 76 and 76'. The film so fed is prevented from moving downward in air chamber 20 by differential air pressure between pressurized chamber 20 and vacuum manifold 25 which causes the film to be stationarily held against the plurality of exhaust ports 26 located in the forward wall of air chamber 20. The film strip 12 that is fed into air chamber 20 by film rollers 33 and 33' piles up into the convolute form of a loop or bight 85. When sufficient film strip 12''' has been introduced into air chamber 20 to cause the apex of bight 85 to be in close proximity to the rearward wall of air chamber 20, rotating valve member 29 is positioned so that duct 31 is connected to the source of pressurized air from blower 80. An air pressure differential exists between the upper and lower portions of air chamber 20 and the loop of film forms the boundary between the two volumes of air at different pressures. Film loop 85 moves in response to the unequal forces down chamber 20. Pressurized air is continuously introduced into air chamber 20 so that the pressure differential continues to exist and the film loop passes the junction point of duct 32 with air chamber 20. At this moment rotating valve member 29 is positioned so that air duct 32 is connected with the pressurized air from blower 80 and duct 31 is disconnected therefrom. Pressurized air is now introduced into air chamber 20 through duct 32 and film bight 85 is uninterruptedly propelled down chamber 20 past photographic aperture 18 and out the open lower end of air chamber 20. At the moment one film loop is expelled from air chamber 20 duct 31 is again connected to the source of pressurized air by rotation of valve member 29 and another film loop, formed from film strip 12 continuously introduced into chamber 20 while the now expelled film loop was being propelled through air chamber 20, is moved down air chamber 20 completing the cycle. Cyclic repetition of this sequence of events operably advances film strip 12 past photographic aperture 18 as is required in motion picture apparatus.

The dimensions of the loops of film formed are such that the difference in the length of the film forming a bight and the length of the base of a bight is equal to the height of one film frame. The passage of a loop past photographic aperture 18 displaces film strip 12 one frame at the aperture. Film strip 12 is retained against the forward wall of air chamber 20 by differential air pressure hereinbefore described causing film bights passing along film strip 12 in air chamber 20 to be formed from continuously changing segments of the film strip in a fashion identical to that described hereinbefore with reference to FIGURES 1, 2 and 3.

Figure 9:
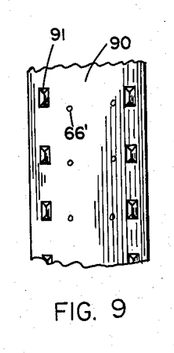
FIGURE 9 is an elevation of another embodiment of the device of FIGURE 7.

In FIGURE 9 is shown a modification of the common wall of air chamber 20 and vacuum manifold 25 of FIGURES 7 and 8 wherein rack guide plate 90 is provided with exhaust ports 66' similar to exhaust ports 26 of FIGURES 7 and 8 and with projections 91 which operably engage perforations in conventional perforated film strip. The provision of projections 91 insures perfect registry of the film strip at the optical aperture of the apparatus.

The film transport embodiments of this invention can be used in conjunction with a motion picture projector or with a motion picture camera, or in a preferred embodiment, can be used in apparatus which can be converted from a camera to a projector. Motion picture film strip provided either with or without perforations can be used in the embodiments described. If conventional perforated film is used the rollers that are employed in the described apparatus may be replaced with conventional sprockets or by a combination of rollers and sprockets. As can be readily understood from the foregoing description film strip in a camera or projector of this invention is subjected to continuous movement at a substantially uniform rate and as a consequence the film is subjected to only minimal stresses even during high speed cinemagraphic exposure or projection. When desired, registry of a frame in the optical path of the photographic apparatus may be insured by providing sprocket wheels, in the case of the mechanical embodiments of the invention, and a toothed rack along the length of the evacuated chamber in the pneumatic embodiment of the invention. With conventional perforated 8 mm., 16 mm. or 35 mm. film strip the use of sprocket wheels or racks insures perfect registry of the film in the optical path. When high speed film changing is utilized in the pneumatic embodiment of the invention, perforated film strip may be used since the passage of air through the perforations in the film strip is subject to fluid friction of a magnitude such as to minimize the effect of air leakage, and the loss of speed that occurs in wave-like loop of film as it travels along the evacuated chamber may be compensated by increasing the pressure of air which surges down the chamber driving the loop. In all embodiments of this invention it is advantageous to utilize materials which are resilient and which have high frictional coefficients for components with which the film strip comes in contact. Thus, the interior of the evacuated chamber in the embodiment of the invention illustrated in FIGURES 7 and 8 and the guide plate in the embodiments illustrated in FIGURES 1–6 may preferably be lined with gum rubber, sponge rubber or other non-abrasive and non-adhesive material which has a relatively high coefficient of friction. Polished steel rollers and sprockets such as are used in conventional cameras and projectors may also be used, and molded thermoplastic material such as nylon, polyethylene or similar lubricious light weight material is operable.

Figure 10:
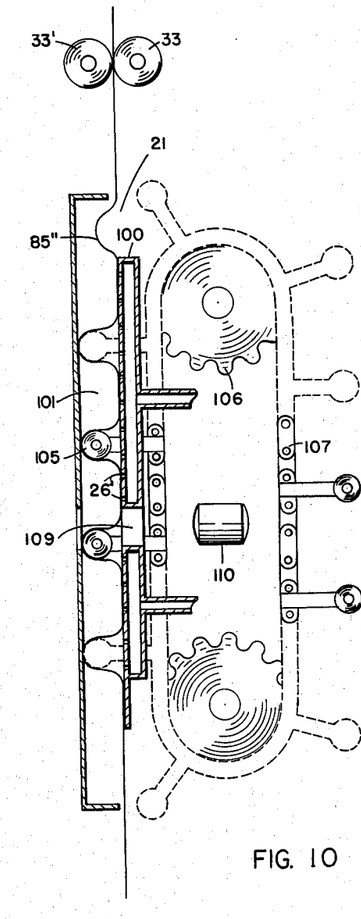
FIGURE 10 is a schematic side elevation of another embodiment of this invention.
Figure 11:
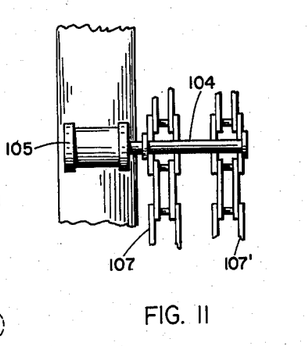
FIGURE 11 is a front elevation of a portion of the device of FIGURE 10.

In FIGURES 10 and 11 is shown another embodiment of the invention wherein mechanical and pneumatic means are combined for operably forming and transporting a film loop or bight past a film gate. Vacuum manifold 100 similar to vacuum manifold 25 of FIGURE 9 is provided adjacent to chamber 101 and is interconnected thereto by means of ports 26' in a manner similar to that shown in FIGURE 9. Film feed rollers 33 and 33' feed film strip through slot 21' into chamber 101. Film piles up in the chamber into a convolute loop or bight 85" in the upper extremity of chamber 101 as shown. Vacuum manifold 100 extends along only a partial length of chamber 101 and film strip 112 is enabled to operably loop across the upper end of chamber 101. The pressure differential between atmospheric pressure in chamber 101 and a partial vacuum in vacuum manifold 100 retains film strip 112 in contacting adjacency to the front wall of chamber 101 immediately adjacent vacuum manifold 100. Film bight 85" is moved down chamber 101 by member 104 and roller 105, on chain 107 passing over sprocket 106 in operable manner so that roller 105 is disposed within loop 85" and causes loop 85" to be operably moved down the chamber in a manner similar to that herefore described. As shown in FIGURE 11, roller 105 is disposed on member 104 which is offset from the plane of chain 107 and 107' in a preferred embodiment; however, any other arrangement may be provided which will operably enable roller 105 to be passed downward through chamber 101 in a manner which will operably transport film loops 85" past film gate 109 and lens 110 in operable manner. It is necessary to position rollers 105 with respect to gate 109 and lens 110 so that one roller 105 will pass in front of lens 110, while another roller 105 within chamber 101 is simultaneously passing between lens 110 and gate 109, thereby enabling rollers 105 to be returned through the optical path of the apparatus without interfering with the projection of a film image upon a screen. Chains 107 and 107' are provided in dual arrangement to more rigidly support roller 105 within chamber 101. Dual sprockets may be provided for the chains 107 and 107' in operable manner. It will be understood that pressurized air need not be provided in the apparatus shown in FIGURES 10 and 11, but vacuum manifold must be provided and may be similar to the vacuum manifold shown in FIGURE 7. A vacuum pump may be used rather than an aspirating pump as shown in FIGURE 7. The provision of operable pump means for providing partial vacuums and for providing pressurized air will be obvious to one skilled in the art.

Figures 12, 13, 14:
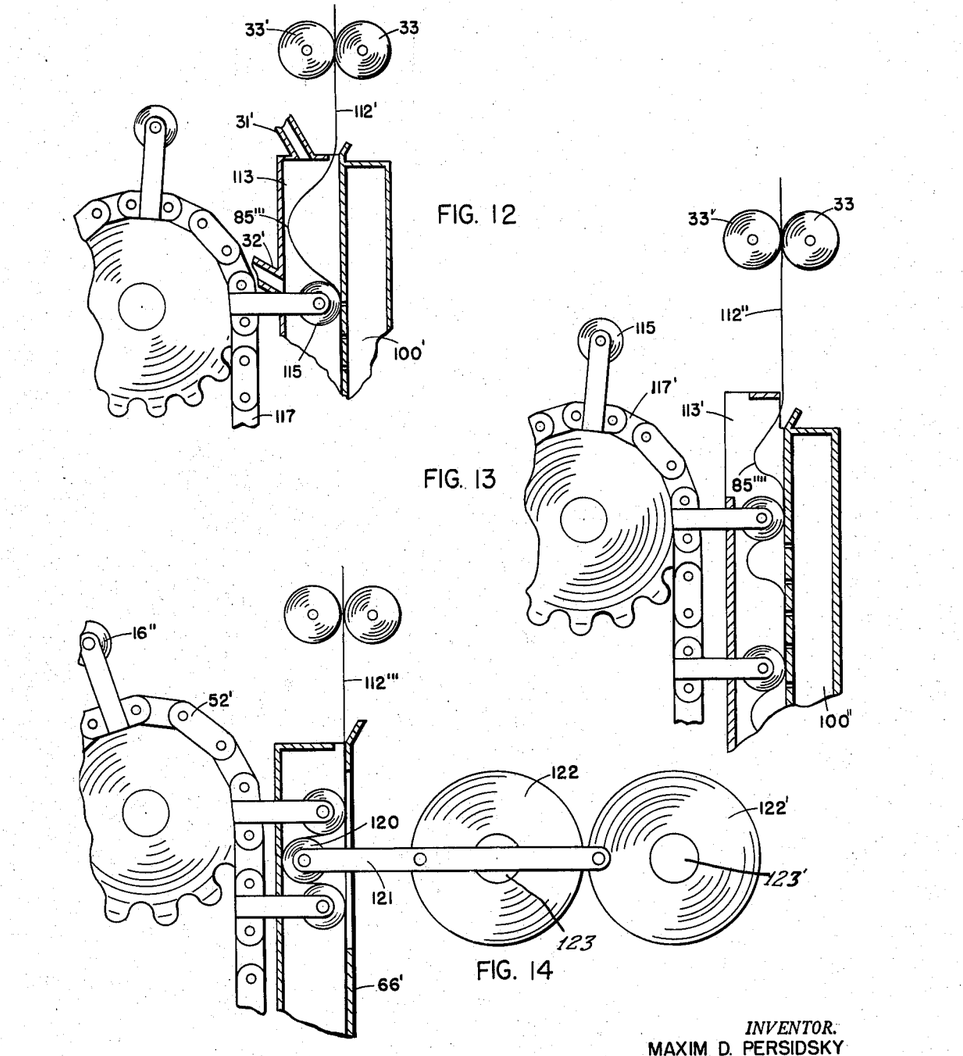
FIGURE 12 is a side elevation of a portion of another device of this invention.
FIGURE 13 is a side elevation of a portion of another device of this invention.
FIGURE 14 is a side elevation of a portion of another device of this invention.

In FIGURE 12 is shown another embodiment of this invention wherein film strip 112' is fed into pressurized air chamber 113 by means of feed rollers 33 and 33' so as to cause a bight or loop 85''' to form within chamber 113. Vacuum manifold 100' is provided in a manner similar to that shown in FIGURE 10. When bight or loop 85''' has been formed by pile-up of film 112' within chamber 113 pressurized air is introduced into the chamber through duct 31' simultaneously with the positioning of roller 115 within chamber 113 in the position shown. Roller 115 is caused to pass along the lower side of bight and to contact film strip 112' below loop 85''' adjacent the frontmost wall of chamber 113. Air introduced into chamber 113 through air ducts 31' and 32' and is controlled by means of a rotating valve identical to valve 29 of FIGURE 8. The movement of film loop 85''' downward within chamber 113 is governed by the speed of operation of chain 117 on which rollers 115 are operably mounted. The provision of mechanical means such as roller 115 to govern the progress of a film loop downward through chamber 113 insures proper coordination of the shutter means and passage of the film loop through the optical path of the photographic apparatus. Means for synchronizing shutter means similar to shutter 79 of FIGURE 8 and chain 117 will be obvious to one skilled in the art.

In FIGURE 13 is shown another embodiment of this invention similar to FIGURE 12, but wherein chamber 113' is subject to atmospheric pressure. Vacuum manifold 100'' is provided on chamber 113' in the manner similar to that shown in FIGURE 12. Feed rollers 33 and 33' introduce film strip 112'' into a chamber 113' and cause film 112'' to pile up in chamber 113' above the level of the top extremity of vacuum manifold 100''. As chain 117' is operated, roller 115 contacts film strip 112'' immediately above loop 85'''' and causes the loop to move down chamber 113' in operable manner. A pressure differential between atmospheric pressure in chamber 113' and partial vacuum within vacuum manifold 100'' prevents film loop 85'''' from advancing downward in chamber 113' faster than the rate of travel of roller 115'. The method of use is identical to that described with relation to other embodiments of this invention.

In FIGURE 14 is shown another embodiment of this invention wherein chain 52', similar to chain 52 of FIGURE 1, is provided with a plurality of sets of roller means 16'' substantially identical to rollers 16 shown in FIGURE 1. Film guide plate 66 is provided adjacent rollers 16'' as shown, and film 112''' is provided between rollers 16'' and film guide plate 66' in operable manner so as to be retained against the guide plate by roller 16''. Cam roller 120 is provided on gyrating reciprocating rod 121, and rod 121 is eccentrically pivoted on rotating wheels 122 and 122' by means of pins 123 and 123' as shown. Rotation of wheels 122 and 122' causes rod 121 and cam roller 120 to be gyratorially moved through the plane of guide plate 66' and operably form bights in film strip 122''' between rollers 16''. Movement of chain 52' causes roller 16'' to operably move a bight in film strip 112''' down chamber 113 in operable manner.

It is to be understood that the scope of the invention extends to other means of propagating a convoluted anomaly in a film strip past a photographic aperture whether such means provide two or more sets of progressively moving rollers, sprockets, balls, or sliding or frictional elements or whether the convoluted anomaly in the film is formed by force from a fluid jet or by feeding film strip at a rate which causes an anomaly to arise from the plane of the film. Numerous mechanical and pneumatic means for producing an anomaly in film will be obvious to persons skilled in the art.

The speed at which the camera or projector equipped with the means of this invention can be operated is limited only by the physical properties of the film strip. The more flexible the material from which the strip is composed, the more rapid can be the operation of the apparatus of this invention. When high strength film such as polyethylene terephthalate film of fractional mil thickness is used the speed with which frames can be exposed or projected is relatively greater than can be accomplished with conventional film and apparatus.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. In photographic apparatus having an operating cycle of alternate indexing periods and static periods the combination of two endless conveying means respectively adjacent to the face and the back of film strip with each of said conveying means having a plurality of appendant members, each of said members comprising at its outward extremity a pivotally attached rotating member, said appendant members on one (first) conveying means intermeshing with a pair of appendant members on a second conveying means by an appendant member of said first conveying means approaching and contacting the film strip and pressing it into the form of a bight of wave like shape between said pair of appendant members of said second conveying means, said pair of appendant members transporting said bight past a film gate by pressing said film strip against a plate member whereupon said rotating members roll over said film strip past said gate, said first conveying means appending members having receded from proximity with said film strip before reaching said gate.

2. In photographic apparatus having an operating cycle for film strip comprising an indexing period and a static period, the combination with a guide plate having a film gate therein of a first endless chain supported and transported by a plurality of sprocket members, said first endless chain having affixed thereto a plurality of uniformly spaced roller mounts sets appending therefrom substantially in the plane thereof, said roller mounts sets having at their outward extremity rollers pivotally attached thereto, a second endless chain supported and actuated by a plurality of sprocket members, said second endless chain having affixed thereto a plurality of uniformly spaced pairs of roller mounts sets appending therefrom substantially in the plane thereof, said pairs of roller mount sets having at the outward extremity of each said set rollers pivotally attached, said film strip being frictionally restrained on said guide plate by pressure from said rollers of said second chain, film bights in said film strip being intermittently formed by the interaction of rollers of said first endless chain pressing said film strip between a pair of rollers of said second endless chain, said pair of rollers pressing said film strip against said guide plate and maintaining said bight configuration as said second chain and attached rollers traverse past said gate, said first chain having receded from proximity with said film strip before reaching said gate and after said appending fingers of said second chain contact said guide plate.

3. The device of claim 2 wherein a plurality of shutter plates are affixed to said second chain between members of said pairs of said roller sets.

4. In photographic motion picture cameras and projectors apparatus for transporting motion picture film comprising in combination a guide plate having a film gate therein, first film conveyor means having two adjacent parallel link chain components mounted on two sets of sprockets, said chains being joined by pairs of rollers mounted transversely thereon, said rollers extending between members which extend from said chains, said rollers being rotatably mounted on said members, said rollers being conveyed into contact with said film on said guide plate during a portion of the cycle of operation of said chains, a second conveyor means engaging at least three sprockets and having extending therefrom projecting elements on which second roller means are mounted, each of said second roller means on said second conveyor means being disposed between two of said rollers of said first conveyor means, in at least a portion of travel said second roller means being set to project through said guide plate and be separated from said first conveyor roller means by said film strip during a portion of travel, said second roller means not passing past said gate, the interaction of said roller means of said first and second conveyors causing anomalous convolutions in said film strip to be formed adjacent to said guide plate, said roller means of said first conveyor means causing said convolutions in said film to be propagated along said film strip on said guide plate past said gate thereby causing said operable displacement of said film past said gate.

References Cited by the Examiner

UNITED STATES PATENTS

| | | | |
|---|---|---|---|
| 1,244,920 | 10/17 | Thomas | 352—38 |
| 1,412,509 | 4/22 | Carter | 226—76 |
| 2,892,379 | 6/59 | Cooper | 352—166 |
| 3,135,159 | 6/64 | Fabregat et al. | 352—184 |

JULIA E. COINER, *Primary Examiner.*

EMIL G. ANDERSON, G. Y. CUSTER, NORTON ANSHER, *Examiners.*